(12) United States Patent
Price

(10) Patent No.: US 6,922,305 B2
(45) Date of Patent: Jul. 26, 2005

(54) APPARATUS AND METHOD FOR REDUCING VIBRATIONAL EXCITATION IN STORAGE DEVICES WITH DUAL STAGE ACTUATORS

(75) Inventor: Kirk B. Price, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 214 days.

(21) Appl. No.: 10/298,859

(22) Filed: Nov. 18, 2002

(65) Prior Publication Data

US 2004/0095672 A1 May 20, 2004

(51) Int. Cl.[7] ............................................. G11B 5/596
(52) U.S. Cl. .................................................. 360/78.12
(58) Field of Search ............................... 360/78.12, 75, 360/78.05, 77.04, 78.09, 244.3, 245.3, 294.4, 265.9, 97.02, 78.04, 245.4, 245.5

(56) References Cited

U.S. PATENT DOCUMENTS

| | | | |
|---|---|---|---|
| 5,189,578 A | | 2/1993 | Mori et al. ................. 360/106 |
| 5,333,455 A | * | 8/1994 | Yoshioka ..................... 60/533 |
| 5,734,526 A | * | 3/1998 | Symons .................... 360/244.3 |
| 5,764,444 A | | 6/1998 | Imamura et al. ............ 360/109 |

(Continued)

FOREIGN PATENT DOCUMENTS

| | | |
|---|---|---|
| JP | 58128057 | 7/1983 |
| JP | 10293975 | 11/1998 |
| JP | 11120721 | 4/1999 |
| JP | 11-096697 | 9/1999 |

OTHER PUBLICATIONS

DEPOP Head Arm Assembly for Hard Disk Drive, IBM TDB vol. 37 No. 9, p. 35.
Cost Reduction Actuator, IBM TDB vol. 37 No. 4A, pp. 119,120.
Dummyhead re–arrangment for solving actuator resonance problem, Research Disclosure p. 412.
Piezoelectrically Actuated Suspension for Hard Disk Drives, J. Info. Storage Proc. Syst. vol. 1, pp. 321–327.
Flexible dummyhead for de–pop actuator transfer function improvement, Research Disclosure p. 392–393.

*Primary Examiner*—David Hudspeth
*Assistant Examiner*—Fred F. Tzeng
(74) *Attorney, Agent, or Firm*—Kunzler & Associates

(57) ABSTRACT

Disclosed is an apparatus and method for reducing vibration in dual stage actuators of storage devices such as hard disk drives. The apparatus comprises a compensating mass disposed on an outer arm of the storage device in order to balance the mass and inertia of the outer arm. The compensating mass is provided with an actuator that is driven in unison with a dual stage actuator also disposed on the outer arm. The excitation caused by the dual stage actuator is balanced by the excitation caused by the actuator of the compensating mass. The shape and mass of the compensating mass are selected to simulate the mass and inertia of the inner dual stage actuator. By driving the inner dual stage actuator in unison with the actuator and compensating mass, the torsional input of the voice coil motor is substantially reduced.

20 Claims, 6 Drawing Sheets

U.S. PATENT DOCUMENTS

| | | | | |
|---|---|---|---|---|
| 5,856,896 A | * | 1/1999 | Berg et al. | 360/245.3 |
| 5,870,254 A | | 2/1999 | Baserman et al. | 360/104 |
| 5,901,010 A | * | 5/1999 | Glover et al. | 360/78.12 |
| 5,905,608 A | | 5/1999 | Frees et al. | 360/106 |
| 5,936,803 A | | 8/1999 | Berding | 360/104 |
| 5,936,805 A | | 8/1999 | Imaino | 360/104 |
| 5,953,180 A | | 9/1999 | Frater et al. | 360/97.02 |
| 6,029,959 A | * | 2/2000 | Gran et al. | 267/136 |
| 6,034,834 A | * | 3/2000 | Yoshikawa et al. | 360/75 |
| 6,064,550 A | | 5/2000 | Koganezawa | 360/106 |
| 6,088,187 A | | 7/2000 | Takaishi | 360/78.05 |
| 6,100,623 A | | 8/2000 | Huang et al. | 310/317 |
| 6,122,139 A | | 9/2000 | Sri-Jayantha et al. | 360/97.02 |
| 6,157,521 A | | 12/2000 | Utsunomiya | 360/294.5 |
| 6,160,676 A | | 12/2000 | Takaishi | 360/78.05 |
| 6,359,758 B1 | * | 3/2002 | Boutaghou | 360/294.4 |
| 6,376,964 B1 | * | 4/2002 | Young et al. | 310/311 |
| 6,490,118 B1 | * | 12/2002 | Ell et al. | 360/77.04 |
| 6,490,121 B1 | * | 12/2002 | Pruett et al. | 360/78.09 |
| 6,493,177 B1 | * | 12/2002 | Ell et al. | 360/78.05 |
| 6,583,964 B1 | * | 6/2003 | Huang et al. | 360/294.4 |
| 6,621,653 B1 | * | 9/2003 | Schirle | 360/78.12 |
| 6,653,763 B2 | * | 11/2003 | Wang et al. | 310/369 |
| 6,674,605 B1 | * | 1/2004 | Ell | 360/78.05 |
| 6,741,417 B2 | * | 5/2004 | Hsin et al. | 360/78.05 |
| 6,744,589 B2 | * | 6/2004 | Morris et al. | 360/78.05 |

* cited by examiner

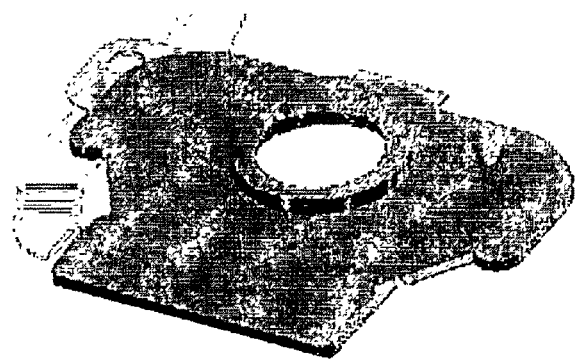
Fig. 3
_Prior Art_

APPARATUS AND METHOD FOR REDUCING VIBRATIONAL EXCITATION IN STORAGE DEVICES WITH DUAL STAGE ACTUATORS

BACKGROUND OF THE INVENTION

1. The Field of the Invention

The present invention relates to digital storage devices having a rotating media and more specifically to systems and methods for finitely positioning a read/write slider in such a storage device.

2. The Relevant Art

Computer systems generally utilize auxiliary storage devices onto which data can be written and from which data can be read for later use. A direct access storage device (DASD) is a common auxiliary storage device in which data is stored in known locations and accessed by reference to those locations. A hard disk drive is a type of DASD that incorporates rotating magnetic disks for storing data in magnetic form on concentric, radially spaced tracks on the disk surfaces.

In a typical hard disk drive, transducer heads driven in a path generally perpendicular to the drive axis are used to write data to and read data from addressed locations on the disks. These transducer heads are mounted on sliders that are comprised of a ceramic substrate with an air-bearing surface. Current hard disk drives also typically utilize an actuator, positioned by a voice coil motor that is connected to the slider by a support arm assembly. The voice coil motor moves the actuator arm, which then moves the slider to the desired track and maintains the selected position over the track centerline during a read or write operation.

FIG. 1a shows one example of a digital storage device of the prior art. Shown in the depicted embodiment is a direct access storage device (DASD) in the form of a magnetic hard disk drive unit 100. The disk drive unit 100 is shown illustrated in a simplified form sufficient for an understanding of the prior art and as one example of the various types of storage devices that might employ the system and methods of the present invention.

The illustrated disk drive unit 100 includes a plurality of disks 102 each having at least one magnetic storage surface 104. The disks 102 are mounted in parallel for simultaneous rotation on and by an integrated spindle and motor assembly 106. Data stored on the surface 104 of each disk 102 is read from and/or written to by a corresponding transducer head mounted on the slider 107 coupled to either an interior arm 108 or exterior arm 109. Arms 108 and 109 are movable across the disk surface 104. As shown in FIG. 1b, the arm 108 supports two head gimbal assemblies ("HGA"), each of which includes a base plate 116, a suspension arm 114, and the slider 107. Rotating the arm 108 causes the slider 107 to be moved in a path that allows it to access the different tracks on the disk surfaces 104. Contrary to the interior arms 108, only one HGA is attached to the exterior arms 109 in order to access only the outer surface 104 of the respective disk 102.

In operation, a voice coil motor 112 controls the plurality of interior arms 108 and the exterior arms 109. The arms 108 and 109 move in a synchronous, rotary direction about the pivot assembly 113 in order to position the slider 107 above data tracks located on the magnetic surfaces 104.

In modern hard disk drive systems the track-to-track spacing, or track pitch on the magnetic disks is decreasing at a dramatic rate. Consequently, currently available designs for actuator and head gimbal assemblies are experiencing increasing difficulty in adequately positioning the slider 107 with sufficient precision over the centerline of the data track during read and write operations. The problem arises from the relative amplitude of the vibration modes of the actuator arm and HGA relative to the track pitch. The vibration modes are excited by airflow over the arms and HGA from the rotation of the disks, airflow buffeting at the edges of the spinning disks, and forces from the currents in the spindle motor and VCM, in addition to other well known sources of excitation. Since the excitation sources, i.e., air flow and external sources, are independent of the track pitch, it is clear that to improve the tracking precision there is a required improvement in the design of the actuator and servo systems.

One method that has been developed to improve finer track positioning is the use of HGAs having multiple positioning means. The essence of this approach is to introduce a secondary actuator that has a lower moving mass than the traditional actuator driven by a VCM. This, in combination with an appropriate servo design, allows a higher bandwidth servo system, with the result that the frequencies associated with the above mentioned excitation sources can be rejected. In operation, generally, a motor such as a voice coil motor performs the gross positioning of the slider, and a secondary actuator is used to achieve the fine positioning. Typically, the secondary actuators are mounted in the base plate, the load beam (not shown), or the gimbal (not shown) of the HGA. The secondary actuators often include piezoelectric transducers ("PZTs") or miniature voice coil motors as the means to provide the fine positioning movement.

HGAs having multiple positioning means are also referred to as the dual stage actuators. Such dual stage actuators are implemented in place of each HGA, so that for interior arms 108 there are two dual stage actuators attached to it and for exterior arms 109 there is only one dual stage actuator attached to it. The dual stage actuators attached to the interior arms 108 simultaneously access the disk surface 104 directly above and below the interior arm 108. The dual stage actuator attached to the exterior arm 109 accesses the disk surface 104 directly below or above the exterior arm 109 depending on whether the exterior arm is the first arm or the last arm in the disk stack assembly. One example of a dual stage actuator is described in U.S. Pat. No. 5,764,444.

An example of a dual stage actuator is shown in FIG. 2. The dual stage actuator 200 comprises a slider 107 that carries the transducer heads (not shown), a base plate 202, first and second PZTs 204 that are used as the secondary actuators, and a suspension 208. Traces 209 carry electrical signals to and from the transducer heads. The electrical signals are used to read and write data on the disk surfaces 104.

The arrows 210 and 212 show the direction of movement caused by the PZTs 204 upon the selective application of voltages to them. The PZTs 204 work in concert to finitely position the slider 107. In order to position the slider 107, one of the piezoelectric transducers 204 is configured to extend while the other contracts. This is accomplished by connecting the piezoelectric transducers 204 with opposite polarities.

For example, when a voltage is applied in such a manner that one of the piezoelectric transducers 204 extends, and the other piezoelectric transducer 204 contracts, the slider 107 moves to the left 210. When the opposite voltage is applied, the slider 107 moves to the right 212. This has proven to be a reliable method of achieving finite positioning of the slider 107. The combination of the dual stage actuators and a suitable servo feedback system provides the capability of reliably positioning the slider 107 on the center line of tracks that are closer and closer to each other and, therefore, achieving greater hard disk data densities.

One problem that arises in the current state of the art for dual stage actuators is that the moving mass of the suspension arm 208 and slider 107 can cause a reaction force or torque in the arms 108 or 109. This reaction torque induces bending stress and torsional stress in the arms 108 and 109, and can excite the vibrational modes in the arms. The amplitude and frequency of these vibration modes can limit the track following performance of the hard disk drive 100 because of the offtrack motion that they cause at the slider 107 mounted on the suspension arm 208.

Two types of vibration affect the suspension arm 208 and slider 107. The first vibration mode is the sway mode. The sway mode is also described as an "in-plane bending" and is caused by the inertial forces due to the acceleration of the actuator by the VCM torque. The in-plane bending causes the slider 107 to vibrate to either side of the data track that the slider 107 is attempting to read or write. The second type of vibration is the torsional mode, which is caused by unbalanced inertial torsional forces about the longitudinal axis (or torsional axis) passing through the center plane of the arm 109. The torsional mode causes the slider 107 to twist in clockwise and counterclockwise directions perpendicular to the suspension arm 208. This also causes the off track motion of the slider 107 preventing it from being aligned with the center of the desired track.

For a hard disk drives with multiple arm actuators, such as the hard disk drive 100 described in FIG. 1, the multiple piezoelectric transducers 204 of each dual stage actuator 200 attached to arms 108 or 109, are typically driven in the same direction in order to minimize the number of control lines 214 of FIG. 2. For interior arms 108 situated between the plurality of disks 102 of FIG. 1, the reaction force of the dual stage actuators on the torsional modes of the arm 108 are balanced due to the symmetrical manner in which two dual-stage actuators are coupled to the arm 108. Thus, the torsional vibration modes are not excited for the interior arms 108 when the associated dual stage actuators are operated in the same direction.

It is apparent that this balanced operation cannot be achieved for the exterior arms 109, since each exterior arm supports only one dual stage actuator. It can be confirmed using modeling schemes that the torsional modes of the outer arms 109 are excited by the moving mass of the single dual stage actuator. Since the mass of the suspension arm 208 and slider 107 is offset from the torsional axis of the outer arm 109 of FIG. 1, the excitation drives both sway and torsion modes. The offtrack error resulting from the torsional vibration of the exterior arms 109 limits the attainable tracking precision performance of the hard disk drive 100 since, typically, the frequencies of the sway and torsion modes are beyond the frequency range in which the servo system is effective. A similar problem exists in the single stage actuator head disk assemblies. In these assemblies, the unbalanced inertial forces of the single HGA on the outer arm excites the torsional modes of the outer arm when the head stack assembly is accelerated by the VCM.

In one current practice to address this problem, a passive or "dummy" mass is placed on the exterior anus so that the combined inertia of the dummy mass and the single HGA act to prevent the excitation of the end arm torsional mode. FIG. 3 illustrates one embodiment of a dummy mass 300 of the prior art attached to the outer arm 109. However, the application of the dummy mass is not effective in the case of a head stack assembly with dual stage actuator since the excitation of the end arm torsion mode is caused by the acceleration of the moving mass of the dual stage actuator. The moving mass consists of slider 107, suspension arm 208, and the traces 209. This is in contrast to the single stage actuator case, where the end arm torsion mode is excited by acceleration of the head stack assembly by the voice coil motor. Thus it is apparent that a new solution is required in the case of the head stack assembly with dual stage actuator.

Accordingly, it should be apparent that a need exists for an improved method to minimize or eliminate the effect of the offset moving mass associated with an exterior arm dual stage actuator such that a slider carrying the read/write transducers can be quickly and accurately positioned over the centerline of a disk drive track in response to control signals from the disk drive and positioning signals from the disk surface of the disk drive.

BRIEF SUMMARY OF THE INVENTION

The system of the present invention has been developed in response to the present state of the art, and in particular, in response to the problems and needs in the art that have not yet been fully solved by currently available disk drives. Accordingly, it is an overall objective of the present invention to provide a disk drive that overcomes many or all of the above-discussed shortcomings in the art.

To achieve the foregoing objective, and in accordance with the invention as embodied and broadly described herein, an improved disk drive is provided. The disk drive comprises an actuator assembly having a plurality of inner arms and adjacent outer arms. The inner arms in one embodiment are each provided with two dual stage actuators. The outer arms are provided with a single dual stage actuator and a compensating actuator.

The compensating actuator comprises a compensating mass that is shaped to simulate the inertia of the moving parts of one dual stage actuator. The compensating actuator also comprises secondary actuators, such as a plurality of piezoelectric transducers, for selectively moving an extension portion of the compensating mass. By implementing the secondary actuators, such as piezoelectric transducers, in the compensating actuator attached to the exterior arms, the effects of the moving mass of the dual stage actuator, which supports a slider, that are attached to the exterior arms are countered by the by the moving mass and inertia of the compensating actuator.

The compensating actuator causes the simulation of the inertia of the dual stage actuator. To achieve this the secondary actuators of the compensating actuator is caused to act similar to the secondary actuators of the dual stage actuators. For example, in situations where the secondary actuators includes PZTs, the PZTs of the compensating actuator are preferably driven in unison with the PZTs of the dual stage actuator sharing the exterior arm with the compensating actuator assembly. Driving the compensating actuator and the dual stage actuator attached to the exterior arms 109 in unison eliminates the effect of the moving masses of the compensating actuator and the dual stage actuator on the torsion modes of the exterior arms. Thus, the compensating actuator actively reduces excitation of the dual stage actuator exterior arm.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 is a perspective view of a dummy mass of the prior art.

DETAILED DESCRIPTION OF THE PREFERRED EMBODIMENTS

Figure 4:
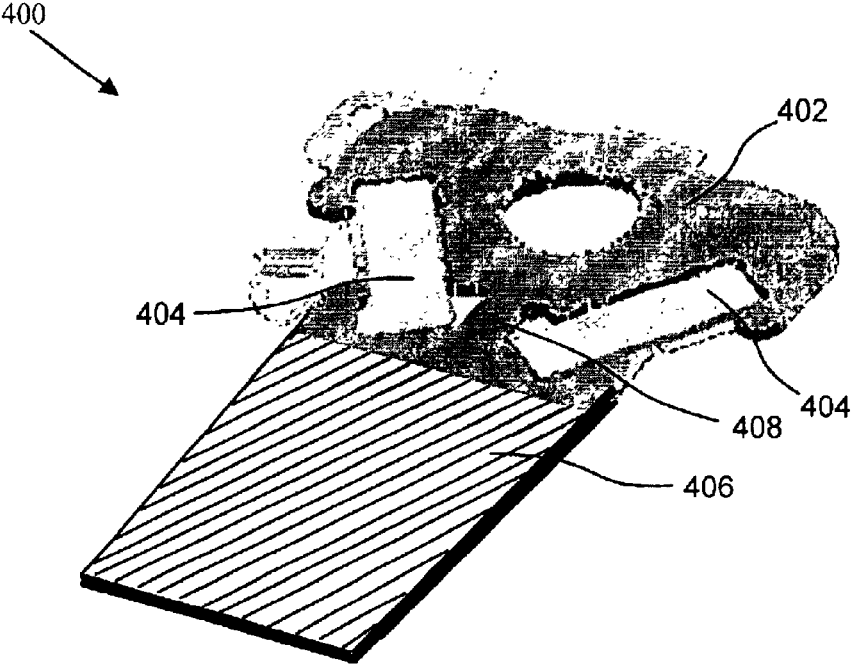
FIG. 4 is a perspective view of one embodiment of a compensating mass of the present invention.

FIG. 4 illustrates one embodiment of a compensating actuator 400 in accordance with the teachings of the present invention. In the embodiment of the FIG. 4, the compensating actuator 400 comprises a base plate 402, a plurality of PZTs 404, and an extended portion 406. The PZTs are the secondary actuators and provide secondary actuation movement. In other embodiments, other types of secondary actuators may be used in place of the PZTs 404. In order to balance the mass of the suspension arm 208 and slider 107 of FIG. 2, the extended portion or ("extension") 406 is configured to simulate the mass and torsional moment of the dual stage actuator assembly 200. The compensating actuator 400 is configured in substantially the same manner as the dual stage actuator 200 of the prior art, except that the compensating mass 406 is substituted for the moving mass comprised of the suspension arm 208 and slider 107. In accordance with the teachings of the present invention, the compensating actuator 400 is configured with a narrow neck portion 408 interposed between the piezoelectric transducers 404.

In operation, the piezoelectric transducers 404 are connected to a power source and may be connected to the same lines that carry power to the piezoelectric transducers 204 of the dual stage actuator 200. In one embodiment, signals of opposing polarity are applied to each piezoelectric transducer 404. In response to applying signals of opposing polarities to the first and second piezoelectric transducers 404, one of the piezoelectric transducers 404 extend while the other piezoelectric transducer 404 contracts. This causes the extended portion 406 to rotate in plane with the base plate 402, about the narrow neck portion 408.

As mentioned above, the mass and inertia of the base plate 402 and the extension 406 are preferably configured to accurately simulate the inertia of the suspension arm 208 and slider 107 attached to the outer arm 109. By simulating the mass and inertia of a single dual stage actuator, the vibration modes operating on the exterior arm 109 are now balanced and operate at a frequency equivalent to those operating on the inner arms 108.

Figure 2:
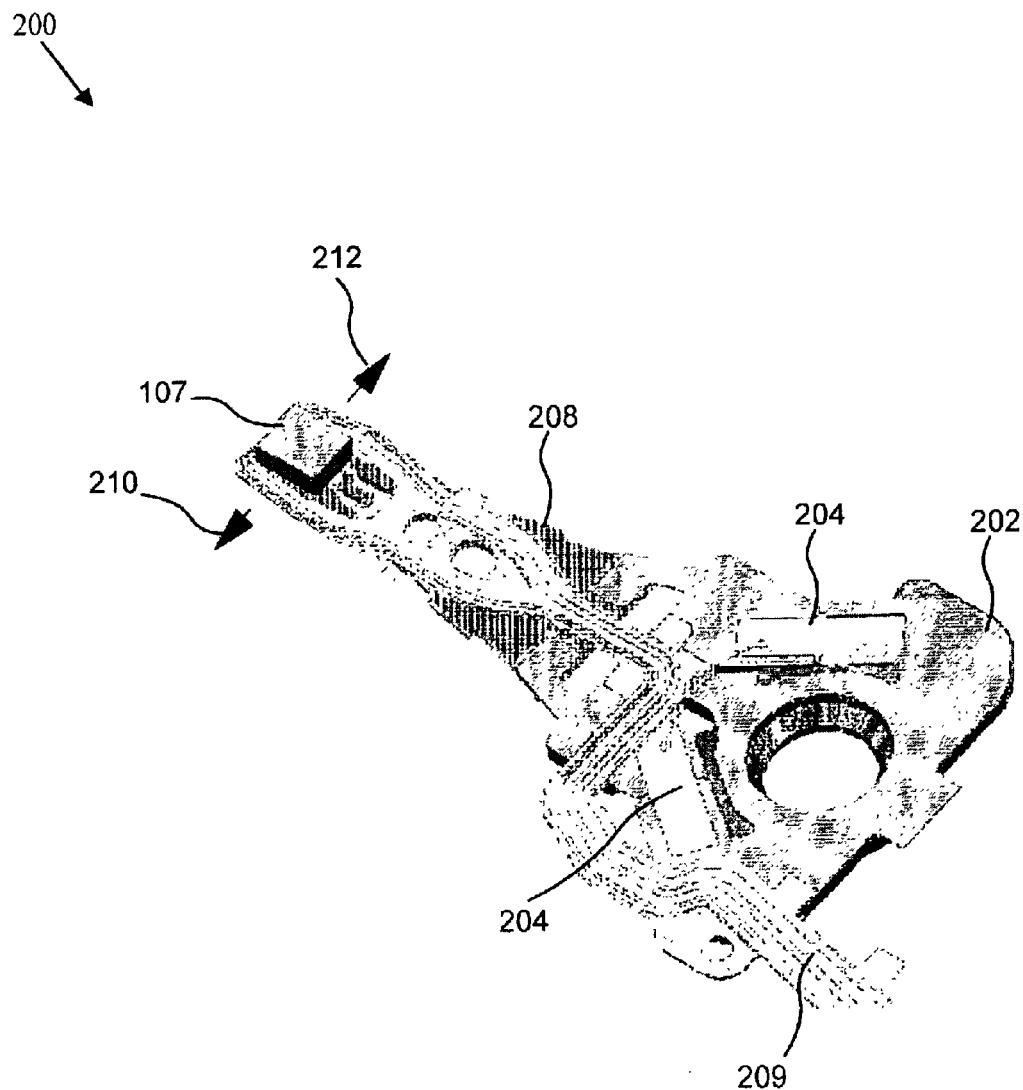
FIG. 2 is a perspective view of a dual stage actuator of the prior art.
Figure 5:
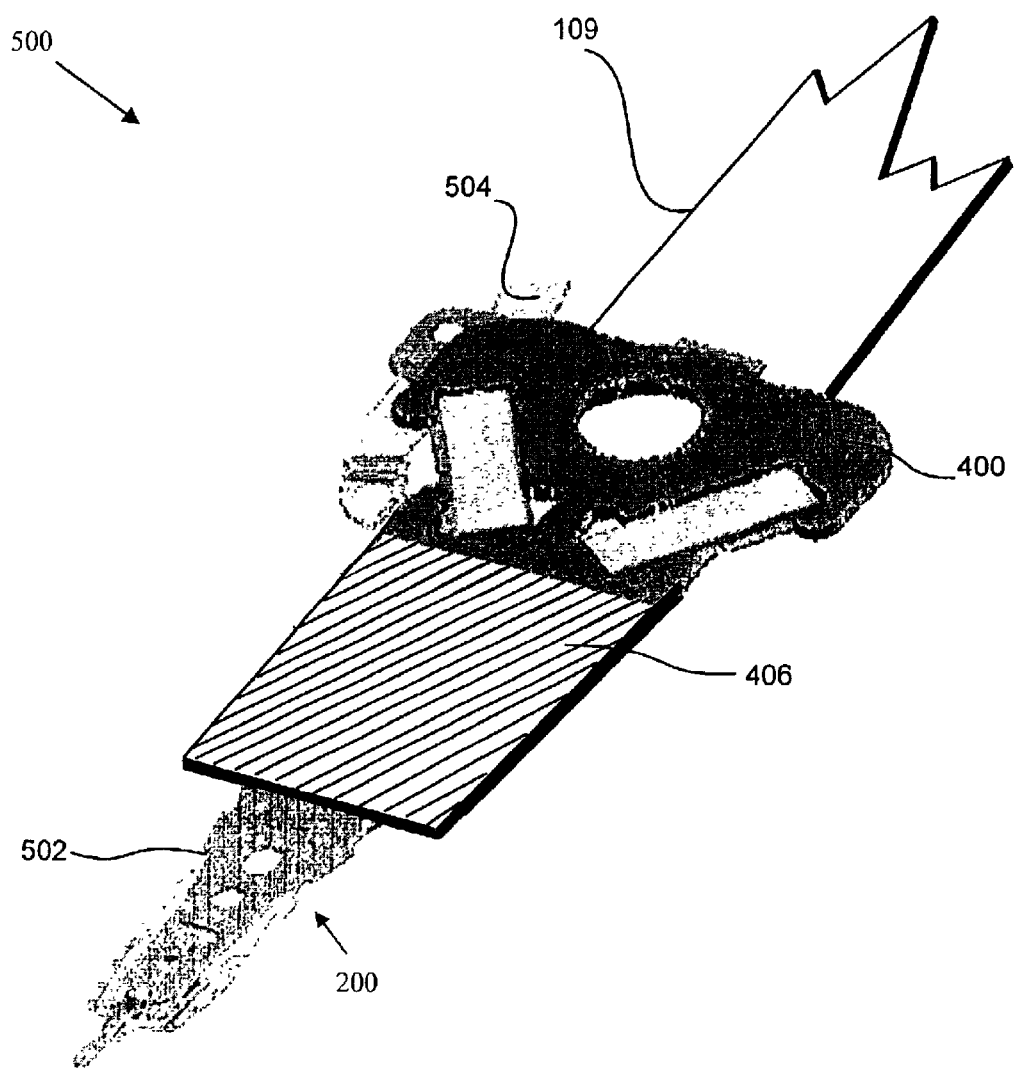
FIG. 5 shows the addition of the compensating actuator of the present invention to the exterior arm.

Referring now to FIG. 5, shown therein is one implementation of the teachings of the present invention. Shown in FIG. 5 are a dual stage actuator 200 and the compensating actuators 400 that are attached to an exterior arm 109. On one side of the arm 109 facing a disk surface 104 is attached a dual stage actuator 200 as depicted in FIG. 2. On the other side of the arm 109 is attached the compensating actuator 400 of the present invention. As discussed above, the compensating actuator 400 is configured in a manner substantially equivalent to the dual stage actuator 200, with the exception of the compensating mass 406 replacing the moving mass, as described above, of the dual stage actuator 200.

In operation, the PZTs 404 of compensating actuator 400 are driven in the same direction with the dual stage actuator 200 that is attached to the same exterior arm in order to prevent torsional input to the exterior arm 109. This prevents the excitation of the torsional mode by providing balanced inertial forces about the torsional axis, as defined above, of arms 109. Due to the elimination of the motion of the slider from the torsion mode of the exterior arm, the performance of the storage device 100 is increased and greater disk data densities are possible.

Figure 1A:
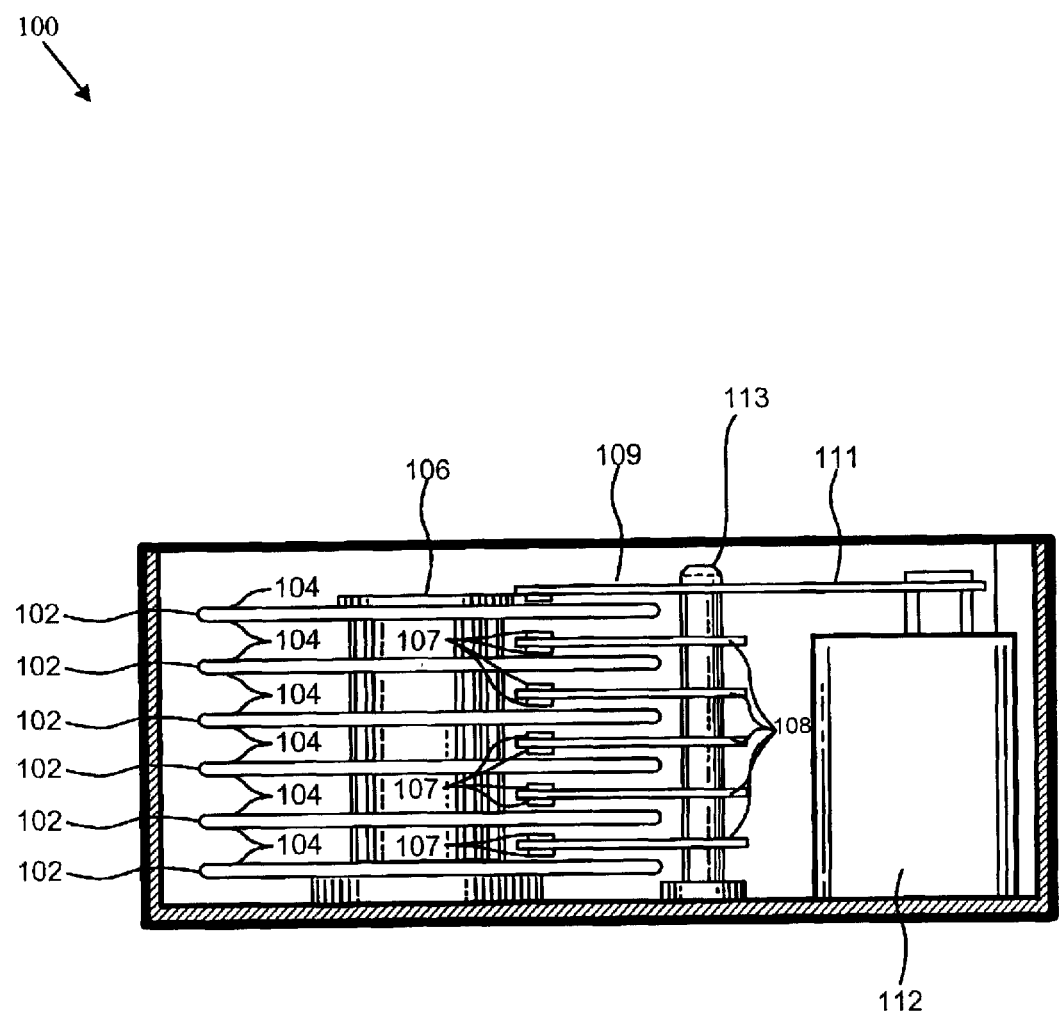
FIG. 1 is a schematic block diagram view illustrating the structure of a hard disk drive of the prior art.
Figure 1B:
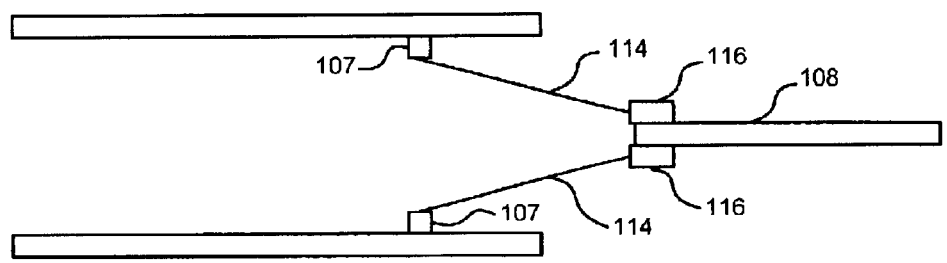
Figure 6:
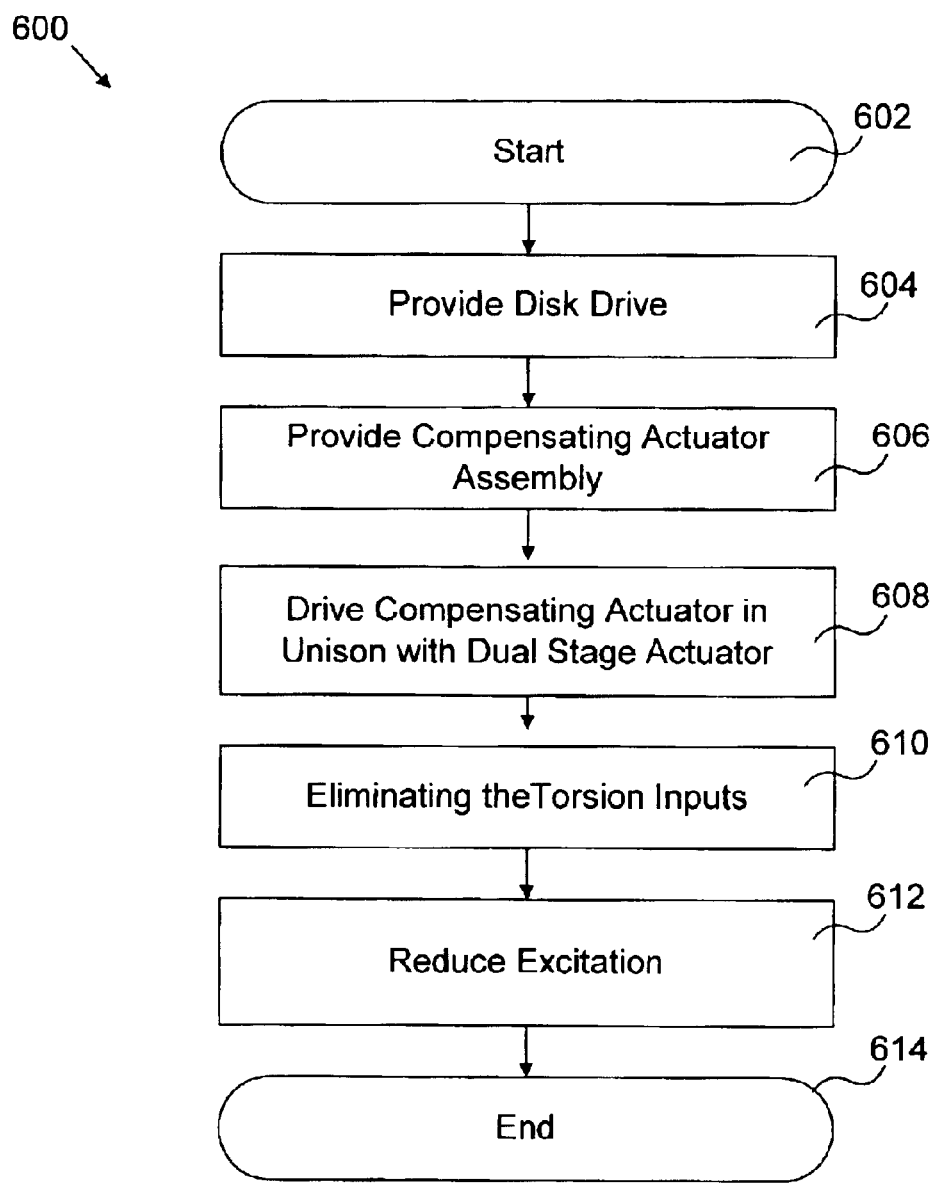
FIG. 6 is a flow chart diagram of one embodiment of a method of operation of a disk drive of the present invention.

FIG. 6 is a flow chart diagram illustrating one embodiment of a method 600 of use of a disk drive employing the exterior arm 109 with the dual stage actuator 200 and compensating actuator 400 as shown in FIG. 5. The method starts 602, after which a disk drive is provided 604. The storage device is preferably configured in the manner discussed for the disk drive 100 of FIG. 1 or the disk drive 200 of FIG. 2, except that a compensating actuator assembly 400 is also provided 606 on the exterior arms 109 of the disk drive 100. In one embodiment, the compensating actuator assembly 400 is configured in substantially the same manner as described above for FIGS. 4 and 5.

The PZTs of the compensating actuator 400 are driven 608 in unison with PZTs of the dual stage actuator 200 sharing the outer arm 109 with the compensating actuator 400. The dual stage actuator 200 and compensating actuator 400 are driven with the same polarities. Driving the compensating actuator and the dual stage actuator 200 in unison eliminates 610 the torsional inputs from the combination of the compensating actuator 400 and the dual stage actuator 200 to the arm 109. Consequently, the excitation of the torsional mode is either reduced 612 or eliminated due to the balanced inertial forces about the torsional axis.

The present invention may be embodied in other specific forms without departing from its spirit or essential characteristics. For Example, as mentioned above, the secondary actuators of the dual stage actuator 200 and the compensating actuators 400 may include mechanisms other than the PZTs to provide the necessary secondary actuation mechanism. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An actuator assembly for a storage device, comprising:
   a plurality of inner arms each having a plurality of dual stage actuators disposed thereon;

an exterior arm having a single dual stage actuator disposed thereon; and a compensating actuator disposed on the exterior arm.

2. The actuator assembly of claim 1, further comprising a second exterior arm having a second compensating actuator disposed thereon.

3. The actuator assembly of claim 1, wherein the compensating actuator comprises a secondary actuator.

4. The actuator assembly of claim 1, wherein the compensating actuator comprises a compensating mass configured to simulate the moving mass and inertia of the single dual stage actuator.

5. The actuator assembly of claim 4, wherein the compensating actuator further comprises a secondary actuator disposed to cause finite movement of the compensating mass.

6. The actuator assembly of claim 5, wherein the compensating mass is configured to be moved by the secondary actuator, thereby simulating an inertia comparable to that of the single dual stage actuator.

7. The actuator assembly of claim 1, wherein the compensating actuator simulates the inertia of the single dual stage actuator.

8. An actuator assembly for a storage device, comprising:

a plurality of inner arms each having a plurality of dual stage actuators disposed thereon;

an exterior arm having a single dual stage actuator disposed thereon; and a compensating actuator disposed on the exterior arm, the compensating actuator comprising a secondary actuator and a compensating mass that simulates a moving mass and inertia of the single dual stage actuator.

9. An actuator assembly for a storage device, comprising:

a plurality of inner arms each having a plurality of dual stage actuators disposed thereon;

an exterior arm having a single dual stage actuator disposed thereon;

a compensating actuator disposed on the exterior arm, the compensating actuator comprising a secondary actuator and a compensating mass that simulates a moving mass and inertia of the single dual stage actuator; and control lines connected to a power source for driving the secondary actuator to simulate the inertia of a single dual stage actuator, thereby simulating the inertia of the single dual stage actuator and actively reducing excitation within the actuator assembly.

10. A storage device system comprising:

a magnetic recording disk;

an actuator assembly comprising:

a plurality of inner arms each having a plurality of dual stage actuators disposed thereon;

an exterior arm having a single dual stage actuator disposed thereon; and a compensating actuator disposed on the exterior arm, the compensating actuator comprising a secondary actuator and a compensating mass that simulates a moving mass and inertia of the single dual stage actuator; and an actuator for moving the interior and exterior arms; and a detector coupled to the interior and exterior arms, the detector configured to detect changes in resistance of the head transducer sensor caused by the changing magnetic fields induced by the magnetically recorded data.

11. An actuator assembly for a storage device, comprising:

a plurality of inner arms each having a plurality of dual stage actuators disposed thereon;

an exterior arm having a single dual stage actuator disposed thereon; and means connected with the exterior arm for removing excitation from the exterior arm.

12. The actuator assembly of claim 11, wherein the means connected with the exterior arm for removing excitation from the exterior arm comprises a compensating mass.

13. The actuator assembly of claim 12, wherein the means for removing excitation from the outer exterior further comprises means for altering the position of the compensating mass.

14. The actuator assembly of claim 13, wherein the means for altering the position of the compensating mass comprises a secondary actuator.

15. The actuator assembly of claim 14, wherein the secondary actuator comprises a piezoelectric transducer.

16. A method of driving dual stage actuators on a storage device, comprising:

providing a plurality of inner arms, each having a plurality of dual stage actuators disposed thereon; and providing an exterior arm adjacent the inner arms, the exterior arm having disposed thereon a single dual stage actuator and a compensating mass, the compensating mass having an actuator thereon.

17. The method of claim 16, further comprising driving the actuator on the compensating mass in unison with the single dual stage actuator.

18. The method of claim 17, further comprising reducing excitation of a torsional mode of the exterior arm.

19. The method of claim 16, wherein driving the actuator on the compensating mass comprises balancing torsion modes within a disk drive.

20. The method of claim 16, wherein driving the actuator comprises applying power of opposite polarities to a pair of piezoelectric transducers embedded within the compensating mass.

* * * * *